United States Patent
Ii et al.

(10) Patent No.: US 7,113,636 B2
(45) Date of Patent: Sep. 26, 2006

(54) METHOD AND COMPUTER PROGRAM PRODUCT FOR GENERATING TRAINING DATA FOR A NEW CLASS IN A PATTERN RECOGNITION CLASSIFIER

(75) Inventors: David L. Ii, Owego, NY (US); Elliott D. Reitz, II, Bradenton, FL (US); Dennis A. Tillotson, Glen Aubrey, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 707 days.

(21) Appl. No.: 10/232,133

(22) Filed: Aug. 30, 2002

(65) Prior Publication Data

US 2004/0042652 A1 Mar. 4, 2004

(51) Int. Cl.
*G06K 9/62* (2006.01)
(52) U.S. Cl. ............................ 382/159; 382/225
(58) Field of Classification Search ................ 382/157, 382/159, 225
See application file for complete search history.

(56) References Cited

U.S. PATENT DOCUMENTS

| | | | |
|---|---|---|---|
| 3,609,687 A | 9/1971 | Sublette | |
| 4,797,937 A * | 1/1989 | Tajima | 382/101 |
| 5,048,100 A * | 9/1991 | Kuperstein | 382/157 |
| 5,060,277 A | 10/1991 | Bokser | |
| 5,537,488 A * | 7/1996 | Menon et al. | 382/170 |
| 5,542,006 A | 7/1996 | Shustorovich et al. | |
| 5,577,166 A * | 11/1996 | Mizuno | 706/20 |
| 5,625,707 A | 4/1997 | Diep et al. | |
| 5,640,200 A * | 6/1997 | Michael | 348/87 |
| 5,657,397 A | 8/1997 | Bokser | |
| 5,751,850 A | 5/1998 | Rindtorff | |
| 5,796,863 A * | 8/1998 | Lyon | 382/157 |
| 5,835,633 A * | 11/1998 | Fujisaki et al. | 382/187 |
| 2003/0055654 A1 * | 3/2003 | Oudeyer | 704/275 |

* cited by examiner

*Primary Examiner*—Joseph Mancuso
*Assistant Examiner*—Damon M Conover
(74) *Attorney, Agent, or Firm*—Tarolli, Sundheim, Covell & Tummino LLP

(57) ABSTRACT

A method and computer program product are disclosed for generating training data over a plurality of feature variables for a new output class in a pattern recognition classifier representing a plurality of existing classes with previously calculated statistical parameters. Deviation measures are generated for each feature variable for each of the plurality of existing classes from the calculated statistical parameters. The deviation measures for each feature variable are averaged across the plurality of existing classes. Feature data is extracted from an ideal pattern, representing the new class, for each of the feature variables. Statistical parameters are approximated for each feature variable for the new class from the extracted feature data and the averaged deviation measures.

20 Claims, 4 Drawing Sheets

METHOD AND COMPUTER PROGRAM PRODUCT FOR GENERATING TRAINING DATA FOR A NEW CLASS IN A PATTERN RECOGNITION CLASSIFIER

BACKGROUND OF THE INVENTION

1. Technical Field

The invention relates to a system for generating training data for new classes in a pattern recognition device or classifier. Image processing systems often contain pattern recognition devices (classifiers).

2. Description of the Prior Art

Pattern recognition systems, loosely defined, are systems capable of distinguishing between various classes of real world stimuli according to their divergent characteristics. A number of applications require pattern recognition systems, which allow a system to deal with unrefined data without significant human intervention. By way of example, a pattern recognition system may attempt to classify individual letters to reduce a handwritten document to electronic text. Alternatively, the system may classify spoken utterances to allow verbal commands to be received at a computer console. In order to classify real-world stimuli, however, it is necessary to train the classifier to discriminate between classes by exposing it to a number of sample patterns.

Training a pattern recognition system requires a large number of samples to obtain acceptable accuracy rates. In some applications, samples will not be available in sufficient number for some or all of the output classes. Even where samples are available in sufficient numbers, collecting and preparing the samples can be a significant expense, especially where the output classes for a particular application change frequently. Further, training a pattern recognition classifier is a time-intensive process that must be repeated with the addition of each new output class. It would be desirable to quickly approximate data from a new output class from a single, ideal sample.

SUMMARY OF THE INVENTION

The present invention recites a method for generating training data over a plurality of feature variables for a new output class in a pattern recognition classifier representing a plurality of existing classes with previously calculated statistical parameters.

Deviation measures are generated for each feature variable for each of the plurality of existing classes from the calculated statistical parameters. The deviation measures for each feature variable are averaged across the plurality of existing classes. Feature data is then extracted from an ideal pattern, representing the new class, for each of the feature variables. Finally, statistical parameters are approximated for each feature variable for the new class from the extracted feature data and the averaged deviation measures.

In accordance with another aspect of the present invention, a computer program product, operative in a data processing system, is disclosed for generating training data over a plurality of feature variables for a new output class in a pattern recognition classifier representing a plurality of existing classes with previously calculated statistical parameters.

An averaging portion generates deviation measures for each feature variable for each of the plurality of existing classes from the calculated statistical parameters and averages the deviation measures for each feature variable across the plurality of existing classes. A feature extraction portion then extracts feature data from an ideal pattern, representing the new class, for each of the feature variables. Finally, a data generation portion approximates statistical parameters for each feature variable for the new class from the extracted feature data and the averaged deviation measures.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

In accordance with the present invention, a method for producing training data for a newly added class in a pattern recognition classifier using a single ideal pattern representing the class is described. The method may be applied to train classifiers used in any traditional pattern recognition classifier task, including, for example, optical character recognition (OCR), speech translation, and image analysis in medical, military, and industrial applications.

It should be noted that the pattern recognition classifier for which training data are produced by the present invention will typically be implemented as a computer program, preferably a program simulating, at least in part, the functioning of a neural network. Accordingly, understanding of the present invention will be facilitated by an understanding of the operation and structure of a neural network.

Figure 1:
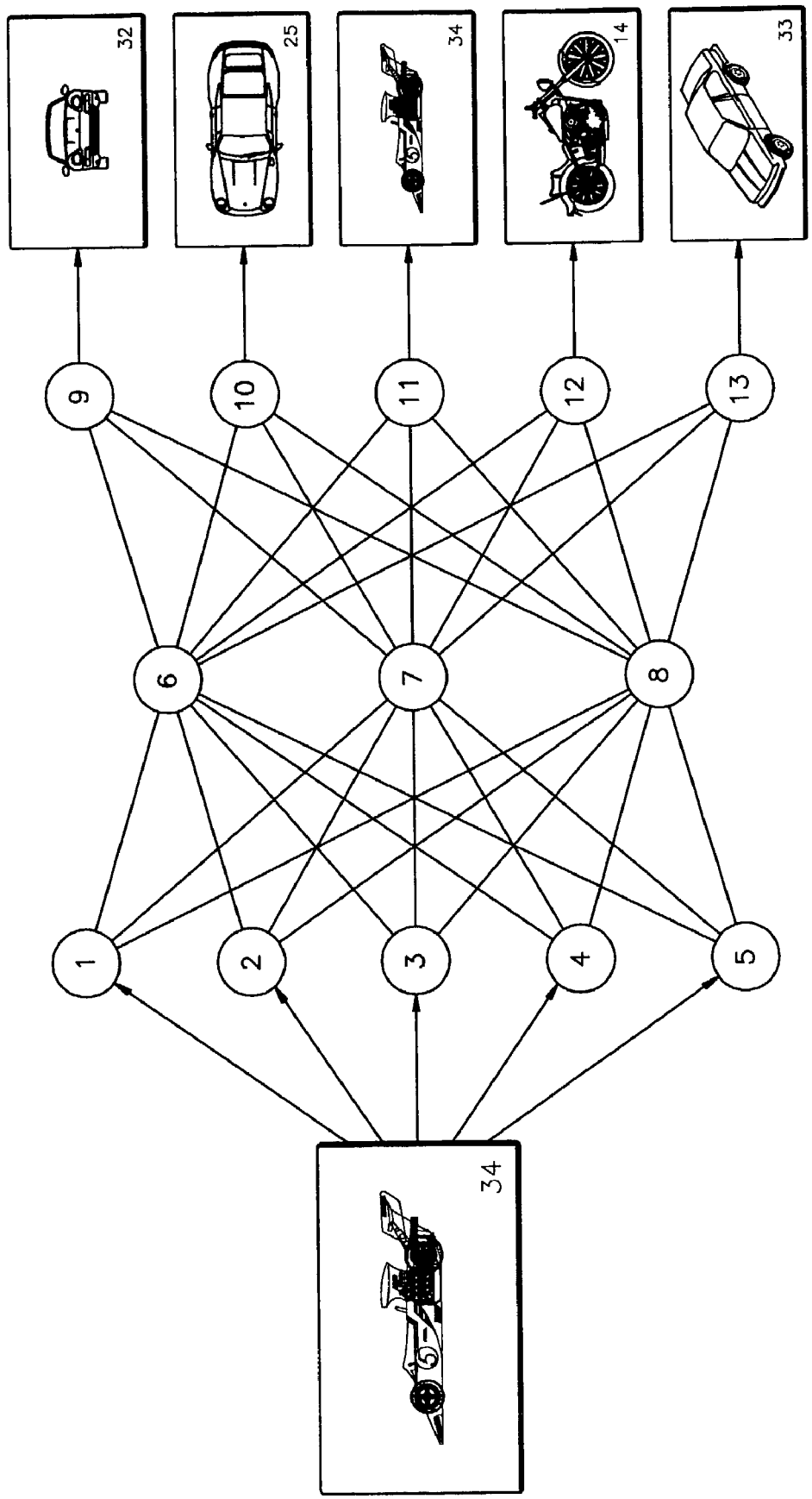
FIG. 1 is an illustration of an exemplary neural network utilized for pattern recognition.

FIG. 1 illustrates a neural network that might be used in a pattern recognition task. The illustrated neural network is a three-layer back-propagation neural network used in a pattern classification system. It should be noted here, that the neural network illustrated in FIG. 1 is a simple example solely for the purposes of illustration. Any non-trivial application involving a neural network, including pattern classification, would require a network with many more nodes in each layer. Also, additional hidden layers might be required.

In the illustrated example, an input layer comprises five input nodes, 1–5. A node, generally speaking, is a processing unit of a neural network. A node may receive multiple inputs from prior layers which it processes according to an internal formula. The output of this processing may be provided to multiple other nodes in subsequent layers. The functioning of nodes within a neural network is designed to mimic the function of neurons within a human brain.

Each of the five input nodes 1–5 receives input signals with values relating to features of an input pattern. By way of example, the signal values could relate to the portion of an image within a particular range of grayscale brightness. Alternatively, the signal values could relate to the average frequency of an audio signal over a particular segment of a recording. Preferably, a large number of input nodes will be used, receiving signal values derived from a variety of pattern features.

Each input node sends a signal to each of three intermediate nodes 6–8 in the hidden layer. The value represented by each signal will be based upon the value of the signal received at the input node. It will be appreciated, of course, that in practice, a classification neural network may have a number of hidden layers, depending on the nature of the classification task.

Each connection between nodes of different layers is characterized by an individual weight. These weights are established during the training of the neural network. The value of the signal provided to the hidden layer by the input nodes is derived by multiplying the value of the original input signal at the input node by the weight of the connection between the input node and the intermediate node. Thus, each intermediate node receives a signal from each of the input nodes, but due to the individualized weight of each connection, each intermediate node receives a signal of different value from each input node. For example, assume that the input signal at node 1 is of a value of 5 and the weight of the connection between node 1 and nodes 6–8 are 0.6, 0.2, and 0.4 respectively. The signals passed from node 1 to the intermediate nodes 6–8 will have values of 3, 1, and 2.

Each intermediate node 6–8 sums the weighted input signals it receives. This input sum may include a constant bias input at each node. The sum of the inputs is provided into a transfer function within the node to compute an output. A number of transfer functions can be used within a neural network of this type. By way of example, a threshold function may be used, where the node outputs a constant value when the summed inputs exceed a predetermined threshold. Alternatively, a linear or sigmoidal function may be used, passing the summed input signals or a sigmoidal transform of the value of the input sum to the nodes of the next layer.

Regardless of the transfer function used, the intermediate nodes 6–8 pass a signal with the computed output value to each of the nodes 9–13 of the output layer. An individual intermediate node (i.e. 7) will send the same output signal to each of the output nodes 9–13, but like the input values described above, the output signal value will be weighted differently at each individual connection. The weighted output signals from the intermediate nodes are summed to produce an output signal. Again, this sum may include a constant bias input.

Each output node represents an output class of the classifier. The value of the output signal produced at each output node represents the probability that a given input sample belongs to the associated class. In the example system, the class with the highest associated probability is selected, so long as the probability exceeds a predetermined threshold value. The value represented by the output signal is retained as a confidence value of the classification.

Figure 2:
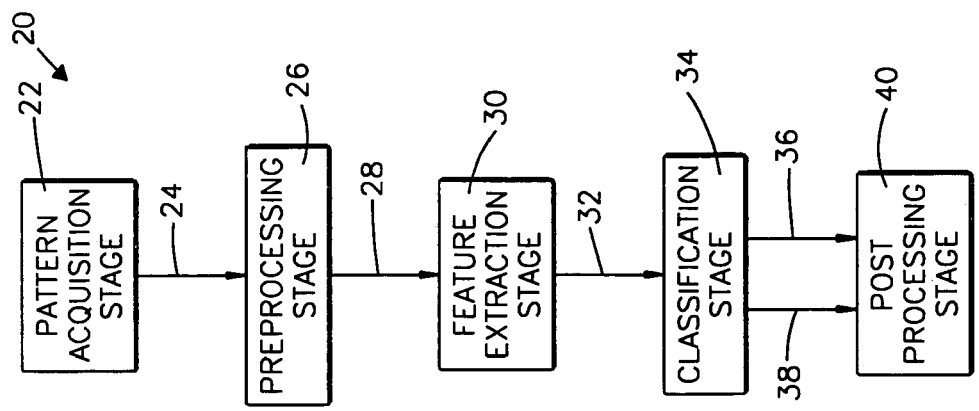
FIG. 2 is a functional diagram of a classifier compatible with the present invention.

FIG. 2 illustrates a classification system 20 that might be used in association with the present invention. As stated above, the present invention and any associated classification system are usually implemented as software programs. Therefore, the structures described hereinafter may be considered to refer to individual modules and tasks within these programs.

Focusing on the function of a classification system 20 compatible with the present invention, the classification process begins at a pattern acquisition stage 22 with the acquisition of an input pattern. The pattern 24 is then sent to a preprocessing stage 26, where the pattern 24 is preprocessed to enhance the image, locate portions of interest, eliminate obvious noise, and otherwise prepare the pattern for further processing.

The selected portions of the pattern 28 are then sent to a feature extraction stage 30. Feature extraction converts the pattern 28 into a vector 32 of numerical measurements, referred to as feature variables. Thus, the feature vector 32 represents the pattern 28 in a compact form. The vector 32 is formed from a sequence of measurements performed on the pattern. Many feature types exist, and they are generally selected based on the characteristics of the recognition problem.

The extracted feature vector 32 is then provided to a classification stage 34. The classification stage 34 relates the feature vector 32 to the most likely output class, and determines a confidence value 36 that the pattern is a member of the selected class. This is accomplished by a statistical or neural network classifier. Mathematical classification techniques convert the feature vector input to a recognition result 38 and an associated confidence value 36. The confidence value 36 provides an external ability to assess the correctness of the classification. For example, a classifier output may have a value between zero and one, with one representing maximum certainty.

Finally, the recognition result 38 is sent to a post-processing stage 40. The post-processing stage 40 applies the recognition result 38 provided by the classification stage 34 to a real-world problem. By way of example, in a postal indicia recognition system, the post-processing stage might keep track of the revenue total from the classified postal indicia.

Figure 3:
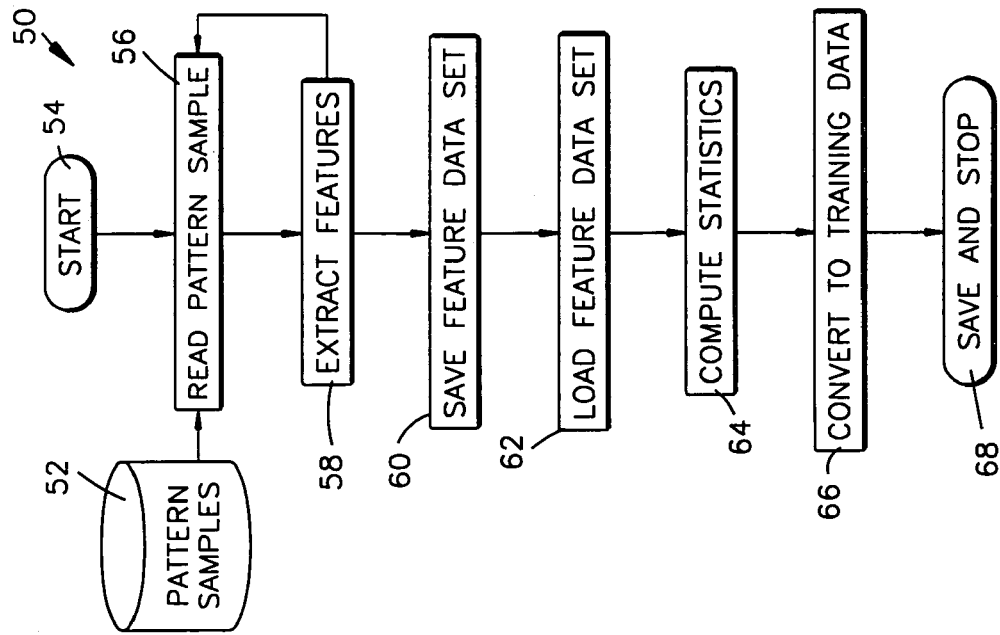
FIG. 3 is a flow diagram illustrating the training of a classifier compatible with the present invention.

FIG. 3 is a flow diagram illustrating the operation of a computer program 50 used to train a pattern recognition classifier via computer software. A number of pattern samples 52 are collected or generated. The number of pattern samples necessary for training varies with the application. The number of output classes, the selected features, and the nature of the classification technique used directly affect the number of samples needed for good results for a particular classification system. While the use of too few images can result in an improperly trained classifier, the use of too many samples can be equally problematic, as it can take too long to process the training data without a significant gain in performance.

The actual training process begins at step 54 and proceeds to step 56. At step 56, the program retrieves a pattern sample from memory. The process then proceeds to step 58, where the pattern sample is converted into a feature vector input similar to those a classifier would see in normal run-time operation. After each sample feature vector is extracted, the results are stored in memory, and the process returns to step 56. After all of the samples are analyzed, the process proceeds to step 60, where the feature vectors are saved to memory as a set.

The actual computation of the training data begins in step 62, where the saved feature vector set is loaded from memory. After retrieving the feature vector set, the process progresses to step 64. At step 64, the program calculates statistics, such as the mean and standard deviation of the feature variables for each class. Intervariable statistics may also be calculated, including a covariance matrix of the sample set for each class. The process then advances to step 66 where it uses the set of feature vectors to compute the training data. At this step in the example embodiment, an inverse covariance matrix is calculated, as well as any fixed value terms needed for the classification process. After these calculations are performed, the process proceeds to step 68 where the training parameters are stored in memory and the training process ends.

Figure 4:
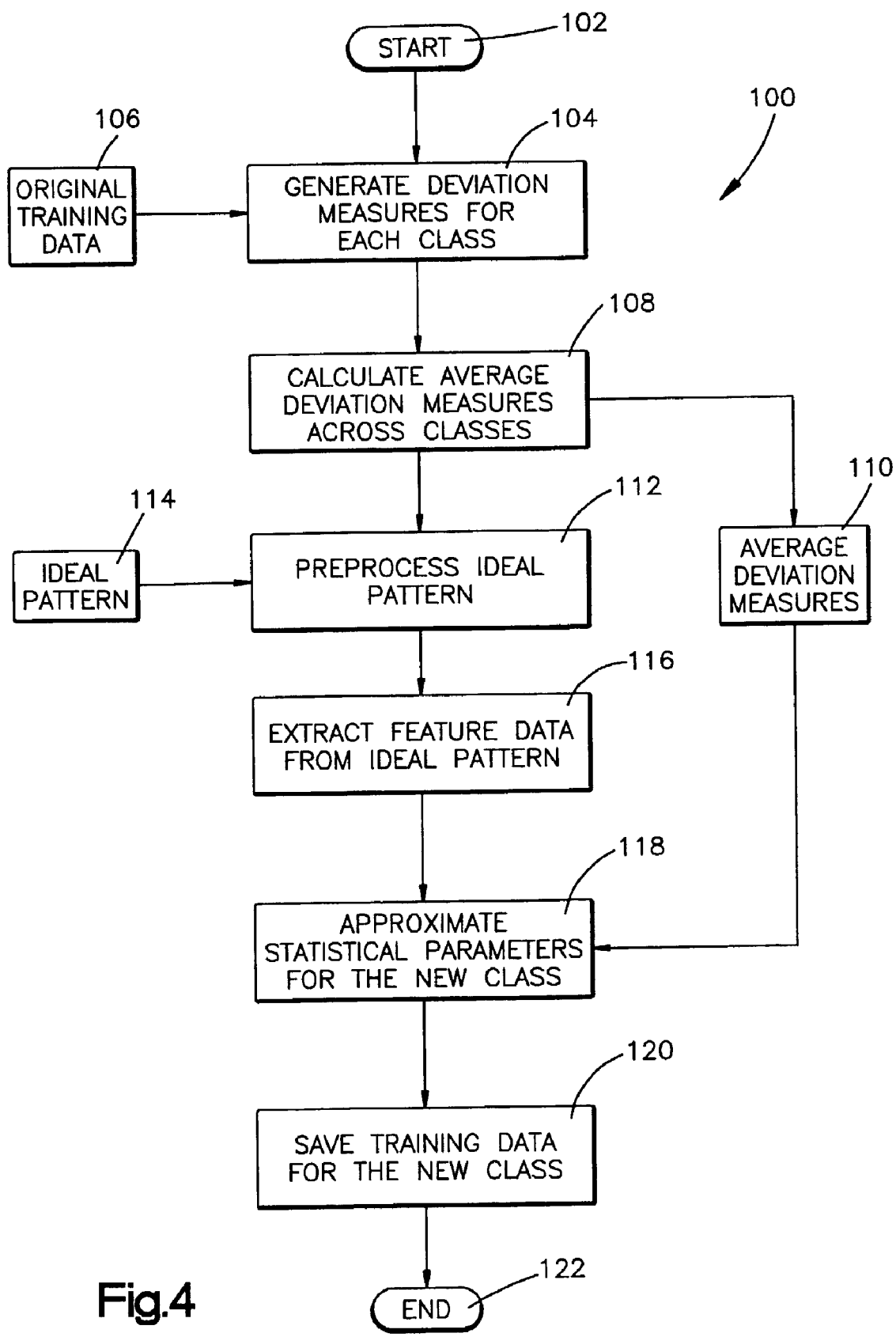
FIG. 4 is a flow diagram illustrating the run-time operation of the present invention.

FIG. 4 illustrates the run-time operation of the present invention. The process 100 begins at step 102. The process then advances to step 104, where deviation measures are generated for each class from statistical parameters derived from the original training data 106 of the system. This original training data may included data generated by ordinary training, such as the process illustrated by FIG. 3, as well as data generated by the approximation means of the present invention. Once the deviation measures have been calculated, the process advances to step 108, where the deviation measures are averaged across classes. These average deviation measures 110 for each feature variable are stored for later use.

The process then continues to step 112, where an ideal pattern 114 is preprocessed by the system. An ideal pattern, as used here, refers to a pattern that is the most typical representative available in all respects for the class it represents. Specifically, the ideal pattern should have the typical noise and imperfections expected in a normally acquired pattern sample. During preprocessing, the pattern is enhanced, portions of interest are located, and obvious noise is eliminated. Other alterations to the ideal pattern may be made to prepare the pattern for further processing.

The process then proceeds to step 116, where feature data is extracted from the ideal pattern. Feature extraction converts the pattern into a group of numerical measurements, referred to as feature values. Each feature variable within the classifier will have a feature value for any specific pattern, based upon measurements performed on the pattern. Many types of features variables exist and are selected based on the characteristics of the recognition problem.

The process continues at step 118, where approximate statistical parameters are calculated for each class. For each feature variable, a base value is obtained during feature extraction. This base value can be considered an approximate mean for the feature variable in the class represented by the ideal pattern. In addition, approximate deviation measures can be provided by averaging the deviation measures of the other classes. Accordingly, a good approximation of the training data for the new class can be developed without the time and expense ordinarily associated with training. This approximation can be refined as additional patterns belonging to the new class are encountered.

The process then continues to step 120, where the approximated training data produced at step 118, is saved in memory. The process terminates at step 122.

Figure 5:
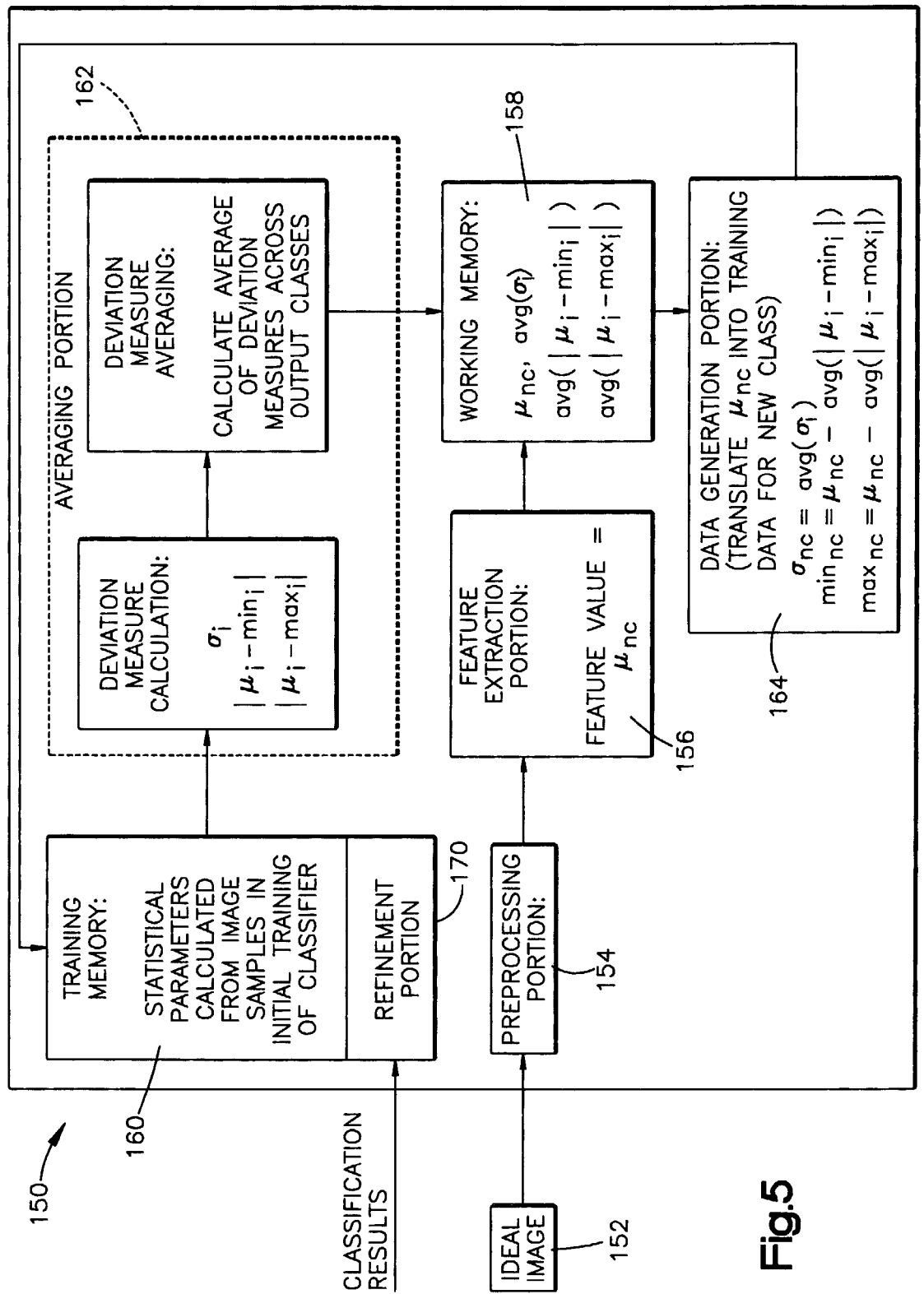
FIG. 5 is a schematic diagram of an example embodiment of the present invention in the context of a postal indicia recognition system.

FIG. 5 is a schematic diagram illustrating the present invention in the context of an image recognition classifier. The system 150 receives an ideal image 152 representing a new output class at a preprocessing portion 154. In the example embodiment, this will be a scanned image of an envelope. At the preprocessing portion 154, extraneous portions of the image are eliminated. In the example embodiment, the system locates any potential postal indicia within the envelope image. The image is segmented to isolate the postal indicia into separate image segments and extraneous portions of the image segments are cropped. Any rotation of the image is corrected to a standard orientation. The preprocessing portion 154 then creates an image representation of reduced size to facilitate feature extraction.

The preprocessed image segment is then passed to a feature extraction portion 156. The feature extraction portion 156 analyzes preselected features of the image segment. The selected features can be literally any values derived from the pattern that vary sufficiently among the various output classes to serve as a basis for discriminating among them. Features can be selected by any reasonable method, but typically, appropriate features will be selected by experimentation. In the preferred embodiment of a postal indicia recognition system, thirty-two feature variables are used, including sixteen histogram feature variables, and sixteen "Scaled 16" feature variables.

A scanned grayscale image consists of a number of individual pixels, each possessing an individual level of brightness, or grayscale value. The histogram variables focus on the grayscale value of the individual pixels within the image. Each of the sixteen histogram variables represents a range of grayscale values. The values for the histogram feature variables are derived from a count of the number of pixels within the image having a grayscale value within each range. By way of example, the first histogram feature variable might represent the number of pixels falling within the lightest sixteenth of the range all possible grayscale values.

The "Scaled 16" variables represent the average grayscale values of the pixels within sixteen preselected areas of the image. By way of example, the sixteen areas may be defined by a four by four equally spaced grid superimposed across the image. Thus, the first variable would represent the average or summed value of the pixels within the upper left region of the grid.

Once the feature data has been extracted, it is stored in a working memory 158. Each of these feature values approximates the mean value for the class for its respective feature variable.

In order to derive the deviation measures for the new class, training data is inputted from a training memory 160 to an averaging portion 162. Within the averaging portion 162, deviation measures are calculated for each feature variable in each class. Such deviation measures can include the range, the variance, the interquartile range, the standard deviation, or similar measures. In the example embodiment, the standard deviation, the difference between the minimum and mean values, and the difference between the maximum and mean values are determined. These deviation values are then averaged across all of the output classes. Thus, the deviation found in each feature variable is represented by a single average deviation value. The values are stored within the working memory 158.

The data generation portion 164 calculates approximate training data for the new class based upon the data contained in the working memory 158. The combination of the average deviation measures and the extracted feature variables allow for a reasonable approximation of the training data for the new class. Parameters such as the interquartile range, the mean, the median, and the standard deviation, among others, may be estimated by this method.

In the example embodiment, four items of training data are calculated for each feature variable. The mean value for the class is approximated by the feature value extracted from the ideal image 152. The standard deviation is approximated as the average standard deviation over all of the classes for that variable. The minimum value for the class is approximated as the extracted feature value lessened by the average distance between the mean and the minimum value across all classes for that variable. Finally, the maximum value is approximated as the sum of the extracted feature value and the average distance between the mean and the maximum value across all classes for that variable. These values are then stored in the training memory 160 as training data for the new output class.

In the example embodiment, an approximation developed through use of the present invention is refined at a refinement portion 170 over the operation of the classifier, as more samples of the specified class are received. Such a system would recursively adjust training data within a system to better represent the samples encountered during run-time operation. In the example embodiment, this is accomplished by a system of subjecting rejected samples closely resembling valid class samples to an independent review and retraining the samples based upon this review.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A method of generating training data over a plurality of feature variables for a new output class in a pattern recognition classifier representing a plurality of existing classes with previously calculated statistical parameters, comprising:
   generating deviation measures for each feature variable for each of the plurality of existing classes from the calculated statistical parameters;
   averaging the deviation measures for each feature variable across the plurality of existing classes;
   extracting feature data from an ideal pattern, representing the new class, for each of the feature variables; and
   approximating statistical parameters for each feature variable for the new class from the extracted feature data and the averaged deviation measures.

2. A method as set forth in claim 1, wherein the method includes the additional step of refining the approximated statistical parameters in response to new data.

3. A method as set forth in claim 1, wherein the ideal pattern is a scanned image.

4. A method as set forth in claim 3, wherein at least one of the plurality of existing classes represent an alphanumeric character.

5. A method as set forth in claim 3, wherein at least one of the plurality of existing classes represent a form of postal indicia.

6. A method as set forth in claim 1, wherein the generated deviation measures include the difference between the mean and the minimum value for each feature variable.

7. A method as set forth in claim 1, wherein the generated deviation measures include the difference between the mean and the maximum value for each feature variable.

8. A method as set forth in claim 1, wherein the approximated statistical parameters include the mean of the new class.

9. A method as set forth in claim 1, wherein the approximated statistical parameters include the minimum value of the new class.

10. A method as set forth in claim 1, wherein the approximated statistical parameters include the maximum value of the new class.

11. A computer program product, implemented in a computer readable medium and operative in a data processing system, for generating training data over a plurality of feature variables for a new output class in a pattern recognition classifier representing a plurality of existing classes with previously calculated statistical parameters, comprising:
   an averaging portion that generates deviation measures for each feature variable for each of the plurality of existing classes from the calculated statistical parameters and averages the deviation measures for each feature variable across the plurality of existing classes;
   a feature extraction portion that extracts feature data from an ideal pattern, representing the new class, for each of the feature variables; and
   a data generation portion that approximates statistical parameters for each feature variable for the new class from the extracted feature data and the averaged deviation measures.

12. A computer program product as set forth in claim 11, where the computer program product includes a refinement portion that refines the approximated statistical parameters in response to new data.

13. A computer program product as set forth in claim 11, wherein the ideal pattern is a scanned image.

14. A computer program product as set forth in claim 13, wherein at least one of the plurality of existing classes represent an alphanumeric character.

15. A computer program product as set forth in claim 13, wherein at least one of the plurality of existing classes represent a form of postal indicia.

16. A computer program product as set forth in claim 11, wherein the generated deviation measures include the interquartile range for each of the feature variables.

17. A computer program product as set forth in claim 11, wherein the approximated statistical parameters include the median of the new class.

18. A computer program product as set forth in claim 11, wherein the approximated statistical parameters include the interquartile range of the new class.

19. A computer program product as set forth in claim 11, wherein the approximated statistical parameters include the standard deviation of the new class.

20. A computer program product, implemented in a computer readable medium and operative in a data processing system, for generating training data over a plurality of feature variables for a new output class in a pattern recognition classifier representing a plurality of existing classes with previously calculated statistical parameters, comprising:
   an averaging portion that generates deviation measures, including a standard deviation, for each feature variable for each of the plurality of existing classes from the calculated statistical parameters and averages the deviation measures for each feature variable across the plurality of existing classes;
   a feature extraction portion that extracts feature data from an ideal pattern, representing the new class, for each of the feature variables; and
   a data generation portion that approximates statistical parameters for each feature variable for the new class from the extracted feature data and the averaged deviation measures.

* * * * *